(12) United States Patent
Smith et al.

(10) Patent No.: US 6,871,215 B2
(45) Date of Patent: Mar. 22, 2005

(54) UNIVERSAL MAIL WIRELESS E-MAIL READER

(75) Inventors: Richard Smith, Annapolis, MD (US); Milan Rami, Baltimore, MD (US)

(73) Assignee: TeleCommunication Systems Inc., Annapolis, MD (US)

( * ) Notice: Subject to any disclaimer, the term of this patent is extended or adjusted under 35 U.S.C. 154(b) by 848 days.

(21) Appl. No.: 09/832,009

(22) Filed: Apr. 11, 2001

(65) Prior Publication Data

US 2001/0029524 A1 Oct. 11, 2001

Related U.S. Application Data

(60) Provisional application No. 60/196,103, filed on Apr. 11, 2000.

(51) Int. Cl.[7] ............................................. G06F 15/16
(52) U.S. Cl. ...................... 709/206; 709/202; 709/227; 709/250; 345/744; 379/93.24; 379/88.17
(58) Field of Search ........................ 709/200, 202–207, 709/218, 219, 227, 238, 246, 250; 379/88.13, 88.14, 88.17, 93.24; 455/412.1; 345/744

(56) References Cited

U.S. PATENT DOCUMENTS

| | | |
|---|---|---|
| 1,103,073 A | 7/1914 | O'Connel |
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,952,928 A | 8/1990 | Carroll et al. |
| 5,014,206 A | 5/1991 | Scribner et al. |
| 5,043,736 A | 8/1991 | Darnell et al. |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori et al. |
| 5,119,104 A | 6/1992 | Heller |
| 5,144,283 A | 9/1992 | Arens et al. |
| 5,161,180 A | 11/1992 | Chavous |
| 5,177,478 A | 1/1993 | Wagai et al. |
| 5,193,215 A | 3/1993 | Olmer |
| 5,208,756 A | 5/1993 | Song |
| 5,214,789 A | 5/1993 | George |
| 5,218,367 A | 6/1993 | Sheffer et al. |
| 5,223,844 A | 6/1993 | Mansell et al. |
| 5,235,630 A | 8/1993 | Moodey et al. |
| 5,239,570 A | 8/1993 | Koster et al. |
| 5,266,944 A | 11/1993 | Carroll et al. |
| 5,289,527 A | 2/1994 | Tiedemann, Jr. |
| 5,293,642 A | 3/1994 | Lo |

(List continued on next page.)

Primary Examiner—Anthony Knight
Assistant Examiner—Crystal J Barnes
(74) Attorney, Agent, or Firm—William H. Bollman

(57) ABSTRACT

A universal mail application maintains login with a plurality of email applications for a particular subscriber, presenting Inbox, Outbox, etc., for an email account as desired, without requiring repeated logouts/logins. The email applications may be defined and identified by email account information files maintained separately for each subscriber, containing, e.g., POP, server and IP address. Sets of email application files corresponding to the multiple email account files contain downloaded and uploaded message files from the respective email application programs. The multiple email account compilation module may be restricted or throttled back to send/receive email from the relevant email application programs only during desirable times, either on a system wide basis or on a per-subscriber (e.g., class of service) basis. The subscriber may peruse the relevant email application files, who is prompted on their mobile display for selection of any one of the email accounts at any one time.

14 Claims, 7 Drawing Sheets

U.S. PATENT DOCUMENTS

| | | | |
|---|---|---|---|
| 5,299,132 A | 3/1994 | Wortham | |
| 5,325,302 A | 6/1994 | Izidon et al. | |
| 5,334,974 A | 8/1994 | Simms et al. | |
| 5,343,493 A | 8/1994 | Karimullah | |
| 5,347,568 A | 9/1994 | Moody et al. | |
| 5,351,235 A | 9/1994 | Lahtinen | |
| 5,361,212 A | 11/1994 | Class et al. | |
| 5,363,425 A | 11/1994 | Mufti et al. | |
| 5,374,936 A | 12/1994 | Feng | |
| 5,379,451 A | 1/1995 | Nakagoshi et al. | |
| 5,381,338 A | 1/1995 | Wysocki et al. | |
| 5,387,993 A | 2/1995 | Heller et al. | |
| 5,388,147 A | 2/1995 | Grimes | |
| 5,390,339 A | 2/1995 | Bruckert et al. | |
| 5,394,158 A | 2/1995 | Chia | |
| 5,396,227 A | 3/1995 | Carroll et al. | |
| 5,398,190 A | 3/1995 | Wortham | |
| 5,406,614 A | 4/1995 | Hara | |
| 5,418,537 A | 5/1995 | Bird | |
| 5,423,076 A | 6/1995 | Westergreen et al. | |
| 5,432,841 A | 7/1995 | Rimer | |
| 5,434,789 A | 7/1995 | Fraker et al. | |
| 5,454,024 A | 9/1995 | Lebowitz | |
| 5,461,390 A | 10/1995 | Hoshen | |
| 5,470,233 A | 11/1995 | Fuchterman et al. | |
| 5,479,408 A | 12/1995 | Will | |
| 5,479,482 A | 12/1995 | Grimes | |
| 5,485,161 A | 1/1996 | Vaughn | |
| 5,485,163 A | 1/1996 | Singer et al. | |
| 5,488,563 A | 1/1996 | Chazelle et al. | |
| 5,497,149 A | 3/1996 | Fast | |
| 5,508,931 A | 4/1996 | Snider | |
| 5,513,243 A | 4/1996 | Kage | |
| 5,515,287 A | 5/1996 | Hakoyama et al. | |
| 5,519,403 A | 5/1996 | Bickley et al. | |
| 5,532,690 A | 7/1996 | Hertel | |
| 5,535,434 A | 7/1996 | Siddoway et al. | |
| 5,539,398 A | 7/1996 | Hall et al. | |
| 5,543,776 A | 8/1996 | L'esperance et al. | |
| 5,552,772 A | 9/1996 | Janky et al. | |
| 5,555,286 A | 9/1996 | Tendler | |
| 5,568,119 A | 10/1996 | Schipper et al. | |
| 5,574,648 A | 11/1996 | Pilley | |
| 5,579,372 A | 11/1996 | .ANG.str om | |
| 5,588,009 A | 12/1996 | Will | |
| 5,592,535 A | 1/1997 | Klotz | |
| 5,604,486 A | 2/1997 | Lauro et al. | |
| 5,606,313 A | 2/1997 | Allen et al. | |
| 5,606,850 A | 3/1997 | Nakamura | |
| 5,610,815 A | 3/1997 | Gudat et al. | |
| 5,614,890 A | 3/1997 | Fox | |
| 5,615,116 A | 3/1997 | Gudat et al. | |
| 5,621,793 A | 4/1997 | Bednarak et al. | |
| 5,628,051 A | 5/1997 | Salin | |
| 5,633,912 A | 5/1997 | Tsoi | |
| 5,673,306 A | 9/1997 | Amadon et al. | |
| 5,682,600 A | 10/1997 | Salin | |
| 5,692,037 A | 11/1997 | Friend | |
| 5,740,534 A | 4/1998 | Ayerst et al. | |
| 5,761,618 A | 6/1998 | Lynch et al. | |
| 5,767,795 A | 6/1998 | Schaphorst | |
| 5,768,509 A | 6/1998 | Gunluk | |
| 5,774,533 A | 6/1998 | Patel | |
| 5,787,357 A | 7/1998 | Salin | |
| 5,794,142 A | 8/1998 | Vanttila et al. | |
| 5,797,091 A | 8/1998 | Clise et al. | |
| 5,797,094 A | 8/1998 | Houde et al. | |
| 5,797,096 A | 8/1998 | Lupien et al. | |
| 5,802,492 A | 9/1998 | DeLorme et al. | |
| 5,806,000 A | 9/1998 | Vo et al. | |
| 5,822,700 A | 10/1998 | Hult et al. | |
| 5,828,740 A | 10/1998 | Khuc et al. | |
| 5,905,736 A | 5/1999 | Rohen et al. | |
| 5,920,821 A | 7/1999 | Seazholtz et al. | |
| 5,930,701 A | 7/1999 | Skog | |
| 5,943,399 A | 8/1999 | Bannister et al. | |
| 5,946,629 A | 8/1999 | Sawyer et al. | |
| 5,946,630 A | 8/1999 | Willars et al. | |
| 5,950,130 A | 9/1999 | Coursey | |
| 5,953,398 A | 9/1999 | Hill | |
| 5,974,054 A | 10/1999 | Couts et al. | |
| 5,978,685 A | 11/1999 | Laiho | |
| 5,987,323 A | 11/1999 | Huotari | |
| 5,999,811 A | 12/1999 | Molne | |
| 6,035,025 A | 3/2000 | Hanson | |
| 6,049,710 A | 4/2000 | Nilsson | |
| 6,058,300 A | 5/2000 | Hanson | |
| 6,064,875 A | 5/2000 | Morgan | |
| 6,070,067 A | 5/2000 | Nguyen et al. | |
| 6,075,982 A | 6/2000 | Donovan et al. | |
| 6,081,508 A | 6/2000 | West et al. | |
| 6,101,378 A | 8/2000 | Barabash et al. | |
| 6,122,503 A | 9/2000 | Daly | |
| 6,122,520 A | 9/2000 | Want et al. | |
| 6,148,197 A | 11/2000 | Bridges et al. | |
| 6,148,198 A | 11/2000 | Anderson et al. | |
| 6,149,353 A | 11/2000 | Nilsson | |
| 6,169,891 B1 | 1/2001 | Gorham et al. | |
| 6,173,181 B1 | 1/2001 | Losh | |
| 6,181,935 B1 | 1/2001 | Gossman et al. | |
| 6,188,752 B1 | 2/2001 | Lesley | |
| 6,198,431 B1 | 3/2001 | Gibson | |
| 6,199,045 B1 | 3/2001 | Giniger et al. | |
| 6,205,330 B1 | 3/2001 | Winbladh | |
| 6,208,854 B1 | 3/2001 | Roberts et al. | |
| 6,223,046 B1 | 4/2001 | Hamill-Keays et al. | |
| 6,226,529 B1 | 5/2001 | Bruno et al. | |
| 6,249,680 B1 | 6/2001 | Wax et al. | |
| 6,249,744 B1 | 6/2001 | Morita | |
| 6,266,614 B1 | 7/2001 | Alumbaugh | |
| 6,289,373 B1 | 9/2001 | Dezonno | |
| 6,317,594 B1 | 11/2001 | Gossman et al. | |
| 6,327,479 B1 | 12/2001 | Mikkola | |
| 6,389,455 B1 * | 5/2002 | Fuisz | 709/206 |
| 6,396,913 B1 | 5/2002 | Perkins, III | |
| 6,671,356 B2 * | 12/2003 | Lewis | 379/88.13 |
| 6,725,268 B1 * | 4/2004 | Jackel et al. | 709/227 |
| 6,779,022 B1 * | 8/2004 | Horstmann et al. | 709/206 |
| 2002/0026513 A1 * | 2/2002 | Hoglund et al. | |
| 2002/0091775 A1 * | 7/2002 | Morehead et al. | |
| 2002/0112007 A1 * | 8/2002 | Wood et al. | |
| 2002/0174194 A1 * | 11/2002 | Mooney et al. | |

* cited by examiner

Class-level diagram

UNIVERSAL MAIL WIRELESS E-MAIL READER

This application claims the benefit of provisional application Ser. No. 60/196,103, filed on Apr. 11, 2000.

BACKGROUND OF THE INVENTION

1. Field of the Invention

This invention relates generally to electronic mail. More particularly, it relates to an efficient integration of multiple electronic mail accounts for viewing by the user from a single application.

2. Background of Related Art

At the current time, most email accounts are accessed via a wired device such as a personal computer (PC) based client, or via an HTML web page.

In today's world, as more and more people develop an on-line presence, people leverage the use of multiple electronic mail accounts. For instance, a particular user might have one electronic mail (email) account from their Internet Service Provider (ISP), another mail account with a webpage based source such as YAHOO or RAGINGBULL, and yet another mail account associated with their business.

Conventionally, a user must access each of these mail accounts using a separately configured mail program.

Using a wireless device, retrieval of email is substantially more limited. Some conventional applications offer 'web-clipping' as a means of retrieving email information and transmitting it to a wireless device. However, wireless devices typically utilize a proprietary application programming interfaces allowing retrieval of email from a single source, e.g., from their ISP, or in any event allow retrieval of mail from a single mail account.

There is a need for a technique and architecture which allows easier access to multiple mail accounts, even from a wireless device.

SUMMARY OF THE INVENTION

In accordance with the principles of the present invention, a universal mail module comprises a plurality of email account information files relating to a corresponding plurality of email accounts of a wireless subscriber. An email agent is in communication with the plurality of email account information files. The email agent maintains a logged-in condition with at least two of the plurality of email accounts. A selection module accepts a selection of one of the plurality of logged-in email accounts for transfer of file information, whereby a wireless subscriber may move back and forth between access to each of a plurality of email accounts without requiring repeated login/logout of any of the email accounts by the wireless subscriber.

A method for allowing a wireless subscriber to move access back and forth between a plurality of different email accounts in accordance with another aspect of the present invention comprises configuring local email account information identifying each of the plurality of different email accounts to a universal mail application. A logged-in condition is maintained with each of the plurality of different email accounts by the universal mail application. Access is provided to the wireless subscriber to any one of the plurality of different email accounts at any time based on a real-time selection made by the wireless subscriber, whereby a wireless subscriber is allowed to move back and forth between each of a plurality of email accounts without requiring repeated login/logout in any of the email accounts.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention relates to a universal mail application for wireless device application which allows a user the ability to access and view email messages from a personal email account using Internet Message Access Protocol (IMAP).

The universal mail application preferably includes multiple front-end user interfaces from WAP and HDML for installation on relevant wireless devices, e.g., on a PQA for PDA software, or on a standard HTML interface.

The universal mail application preferably allows a user access to any supported email accounts, with the ability to easily jump from account to account, view message headers, retrieve specific messages only, delete messages, perform flexible folder searches, reply to messages or send new messages. The universal mail application focuses on a separation of application functionality from presentation or the actual type of wireless device form so as not to be restricted to a single type of wireless device.

Figure 1:
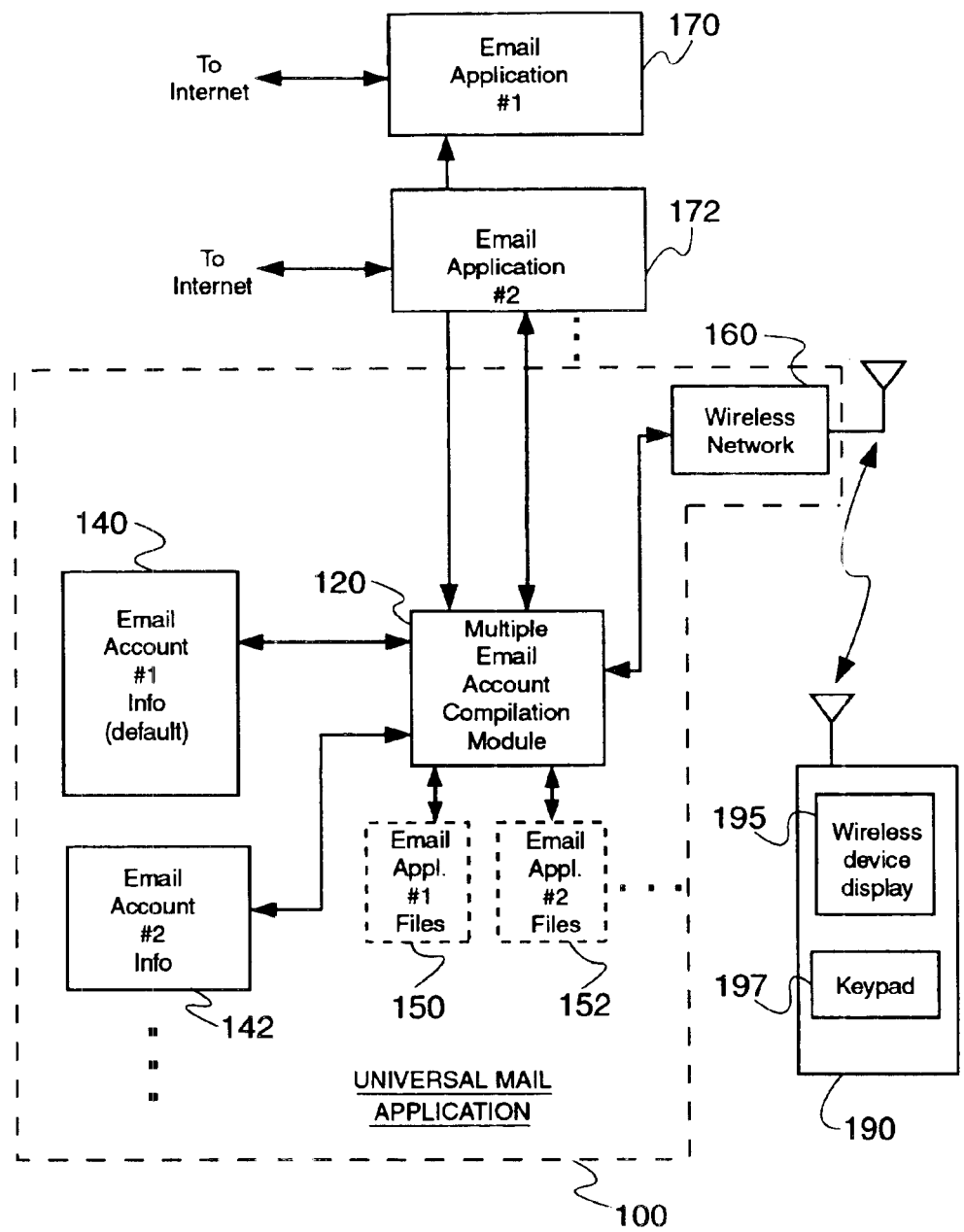
FIG. 1 is a block diagram showing a universal mail application in a wireless network, in accordance with the principles of the present invention.

FIG. 1 is a block diagram showing a universal mail application in a wireless network, in accordance with the principles of the present invention.

In particular, as shown in FIG. 1, a universal mail application 100 operates on an appropriate element of a wireless network 160, e.g., on a Wireless Internet Gateway (WIG), other gateway element, or as an independent standalone application.

An exemplary Wireless Internet Gateway is shown and described in U.S. appl. Ser. No. 09/630,762, filed Aug. 2, 2000, entitled "Wireless Internet Gateway", by Richard Smith, the entirety of which is expressly incorporated herein by reference.

The universal mail application 100 importantly is in communication with a plurality of email applications 170, 172 for any one subscriber. The email applications 170, 172 are defined and identified by appropriate parameters stored in corresponding email account information files 140, 142 maintained separately for each subscriber. The universal mail application 100 is in communication with a wireless network 160, which communicates with numerous wireless devices (e.g., subscriber 190).

One email account information file 140 is designated as a default email account for a particular subscriber 190. Thus, on activation or other suitable event (e.g., upon initial activation of the mobile device), the email application selected for presentation to the subscriber 190 is the particular email account identified in the default email account information file 140.

The email account information files 140, 142 maintain all necessary information to identify a particular email account, e.g., a POP account number, a server address, an IP address, etc. (In accordance with the principles of the present invention, multiple email account information files may be maintained for any one subscriber.

Optionally, multiple sets of email application files 150, 152 corresponding to the multiple email accounts 170, 172 may be maintained local to the universal mail application 100, but preferably multiple email sessions are maintained by the multiple email account compilation module 120 negating the need to maintain local 'copies' of email files. The optional email application files 150, 152 may contain downloaded and uploaded message files from the respective email application program 170, 172.

A multiple email account compilation module 120 communicates with the respective email application programs 170, 172, downloading and/or uploading email message files with respect to a particular subscriber at any suitable time. For efficiency purposes from a network perspective, the multiple email account compilation module 120 may be restricted or throttled back to send/receive email from the relevant email application programs 170, 172 only during desirable times (e.g., during non-peak hours), either on a system wide basis or on a per-subscriber (e.g., class of service) basis.

The email application files 150, 152 maintain the relevant file folders (e.g., Inbox, Outbox, Sent items, Deleted items, Drafts as in a Microsoft OUTLOOK EXPRESS™ format) for perusal by the relevant subscriber 190. In the shown embodiments, the subscriber 190 is prompted on their mobile display 195 for selection of any one of the email accounts at any one time.

For instance, in the given embodiments, a menu is established and shown on the mobile device display 195 asking for the subscriber to select one of their email accounts for current perusal using, e.g., the up and down arrow keys as well as the enter key on their keypad 197.

Importantly, use of a multiple email account compilation module in a wireless network servicing wireless subscribers in accordance with the principles of the present invention allows a user to move easily and quickly from one email account to another without logging out of the last email account and logging into the new email account. Rather, the multiple email account compilation module maintains login with the relevant email applications 170–172, either real-time or periodically.

Figure 2A:
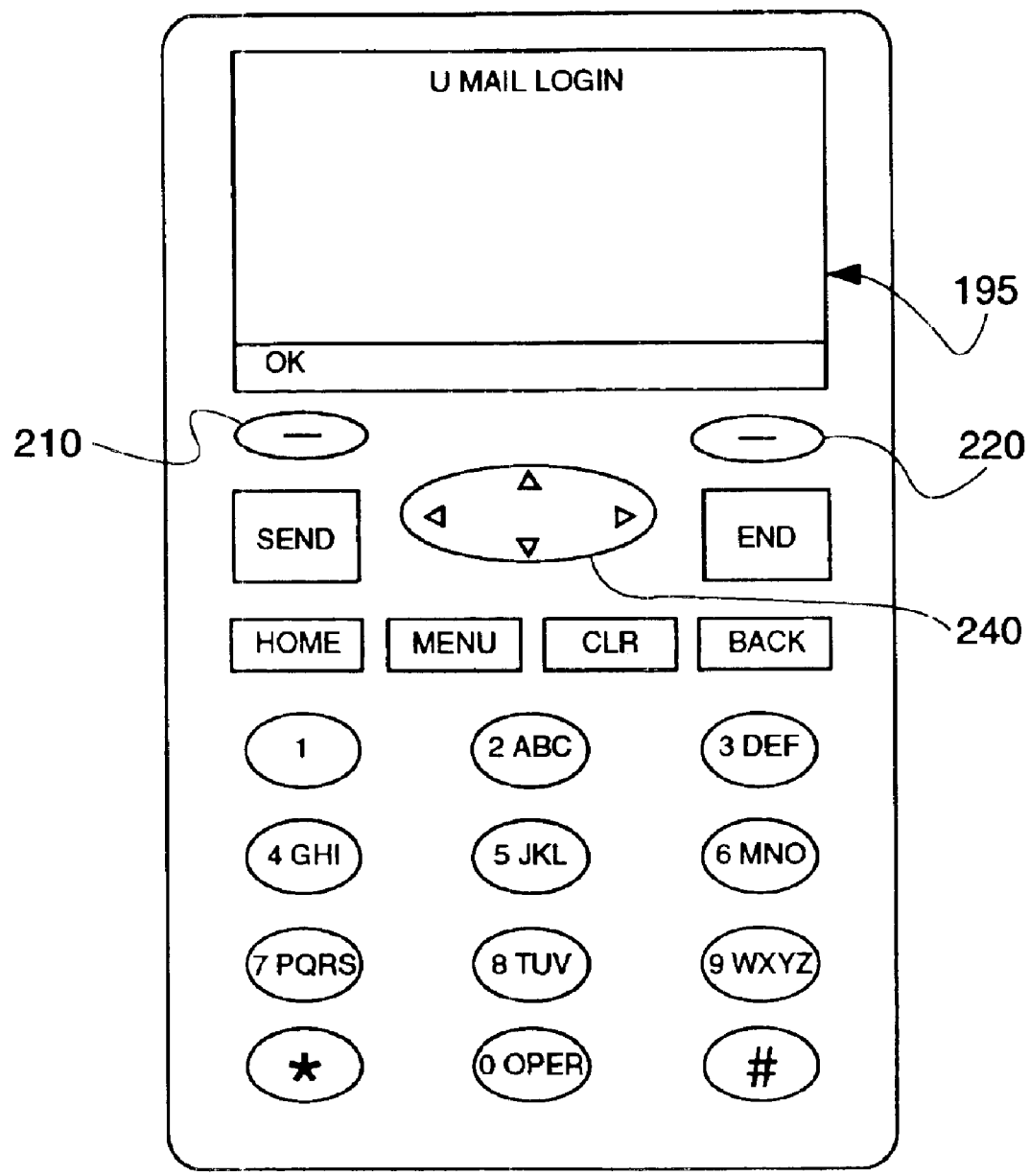
FIGS. 2A and 2B show an exemplary representation of a main interface of the universal mail application (Umail/MoMail), and a sample main menu, respectively, in accordance with the principles of the present invention.
Figure 2B:
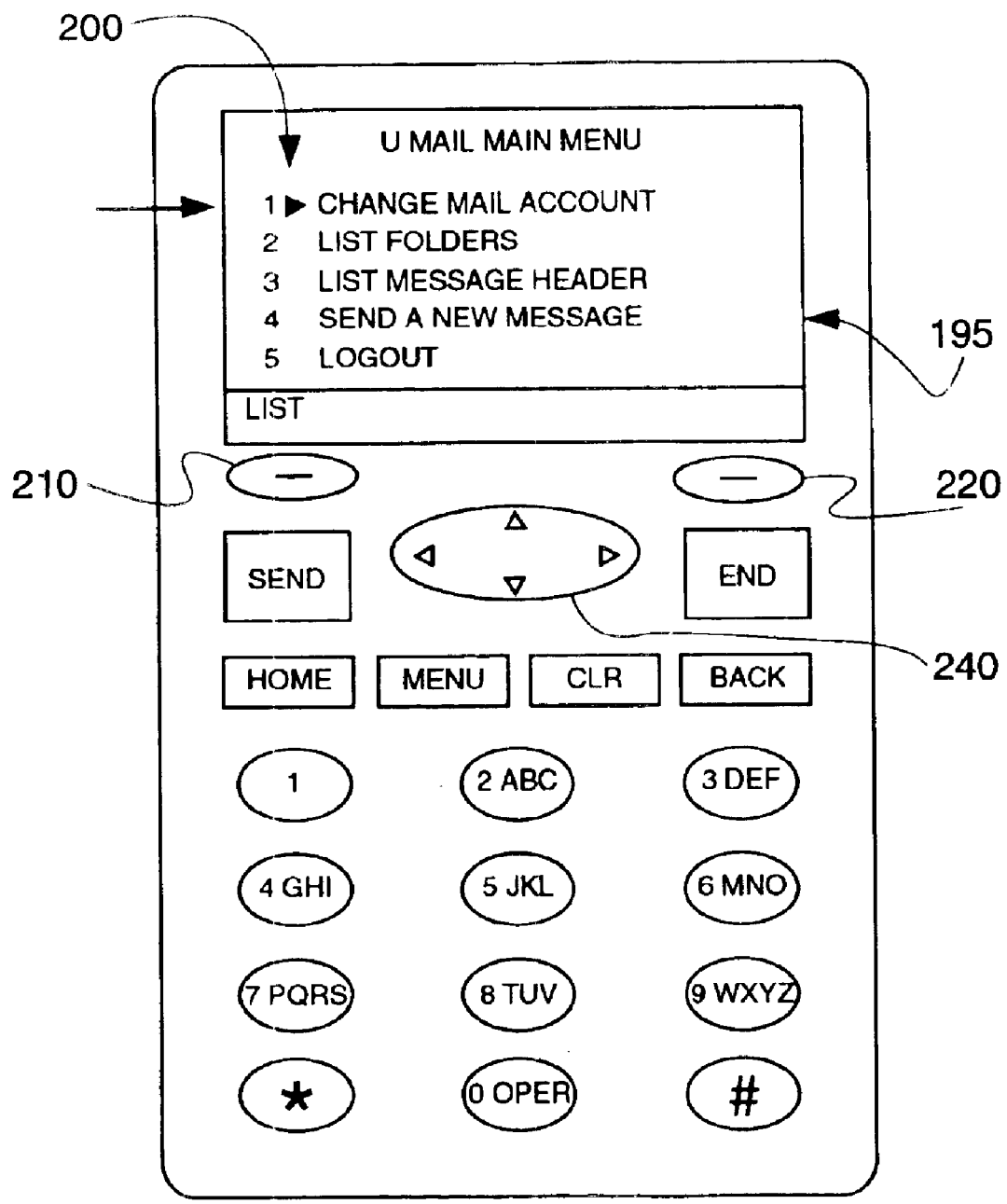

FIGS. 2A and 2B show an exemplary representation of a main display interface of the universal mail application (Umail) 100, and a sample main menu, respectively, in accordance with the principles of the present invention.

In particular, as shown in FIGS. 1, 2A and 2B, a user of a wireless device 190 is allowed to select which account configuration to access (e.g., 140/150 or 142/152) via an appropriate select menu.

Initially, mobile device users configure all relevant configuration information in the relevant email account information files 140, 142 with respect to each of their various mail accounts 170, 172. The users various mail account information for the various mail accounts may be stored, e.g., in a suitable database.

The user's various mail account information files 140, 142 preferably include one email account designated as a default email account for that particular subscriber 190. Upon startup of the wireless device 190, the universal mail application 100 may configure itself for access to the user's default mail account 140/170. Then, as desired by the user, any one of the multiple alternative mail accounts 170, 172 may be accessed at will by the wireless device user.

As is seen in the main menu interface shown in FIGS. 2A and 2B, the user is able to scroll through a main menu on the display 195 and select a desired option. In particular, after a successful login as shown in FIG. 2A, the user may select using arrow keys and selection keys 210, 220, 240 from a plurality of exemplary actions shown in FIG. 2B, including: 1) Change Mail Account, 2) List Folders, 3) List Message Header, 4) Send a New Message, and 5) Logout. Other possible actions include "search folder".

Change Mail Account: As a first exemplary option for the user, the user may "change mail accounts". By changing mail accounts, the user of a wireless device may switch between mail accounts by easily selecting a particular mail account as an active email account.

List Folders: The user mail list the account's different folders (e.g., Inbox, Outbox, Sent Items, Deleted Items, Drafts, etc.).

List Message Header: The user may list the relevant message headers (e.g., From, Subject, etc.) for each message in the 'Inbox' (or other selected folder) of the currently active email account.

If the user selected the 'List Message Headers' option, there may be another scrollable list of the current messages from which the user would be able to select a specific message to retrieve. This allows the user to save in terms of time and bandwidth since only specifically chosen messages are transmitted for display.

From the body to the message, the user then has several options. For instance, the user can simply close the message, delete the message, reply to the message or display the next message.

Search Folder: A user may perform a text-based search operation of the current active folder. This search can be elected to be based on sender names, subject, body text or all of the above. The search would return all a summary list of all messages matching the search criteria.

Send a New Message: A user may send a new mail message using the currently selected mail account.

Logout: The user may of course logout or exit the universal mail application as they desire.

Figure 3A:
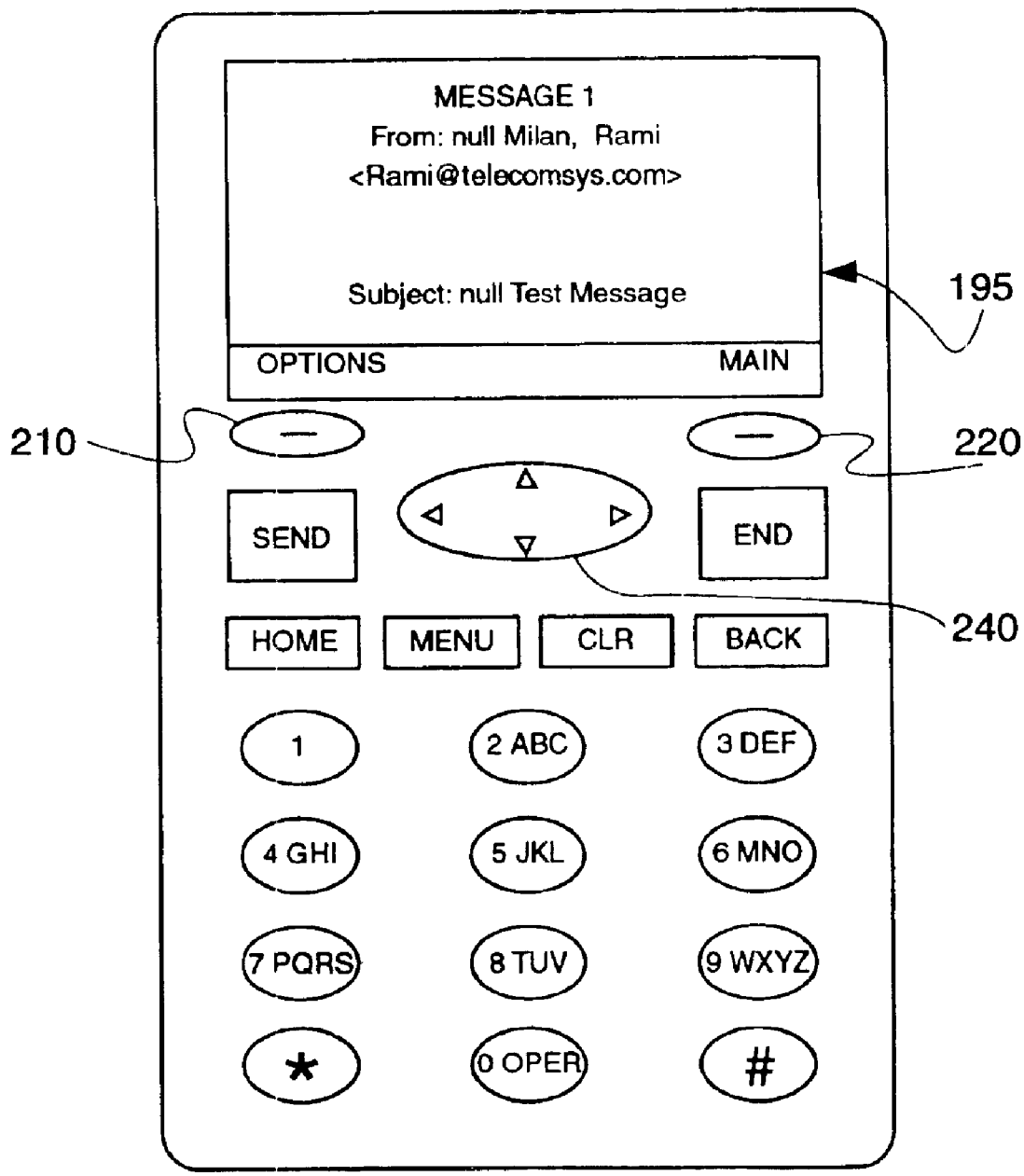
FIGS. 3A and 3B show an exemplary message view option and a sample of the message options menu, in accordance with the principles of the present invention.
Figure 3B:
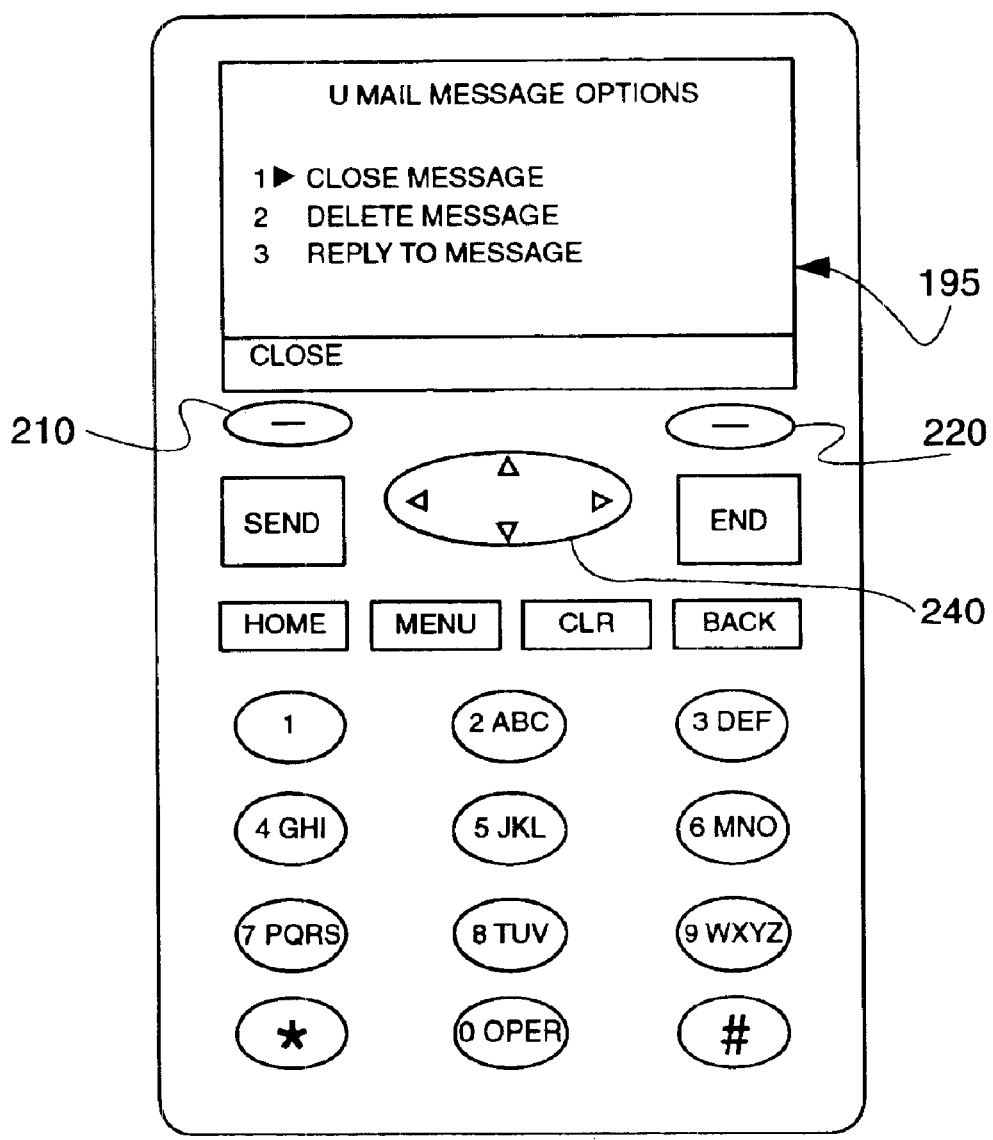

FIGS. 3A and 3B show an exemplary message view option and a sample of the message options menu, in accordance with the principles of the present invention.

In particular, as shown in FIGS. 1, 3A and 3B, if the user selects to 'Send a New Message' from the main menu shown on the display 195 of their wireless device 190, then the universal mail application 100 may prompt the user for appropriate input. For instance, the user will be prompted for an appropriate 'To' email address, a subject, and/or a short text body.

In the disclosed embodiment, a confirmation of the transmission of the email is provided, then the user is returned to the main menu presented by the universal mail application 100.

The email account files 150, 152 need not necessarily be maintained in the universal mail application. For instance, it is preferred that the multiple email account compilation module 120 merely maintain a logged in status with the multiple email accounts for a particular subscriber, and any file requests be forwarded from the subscriber 190 to the email application 170, 172 via the multiple email account compilation module 120.

Figure 4:
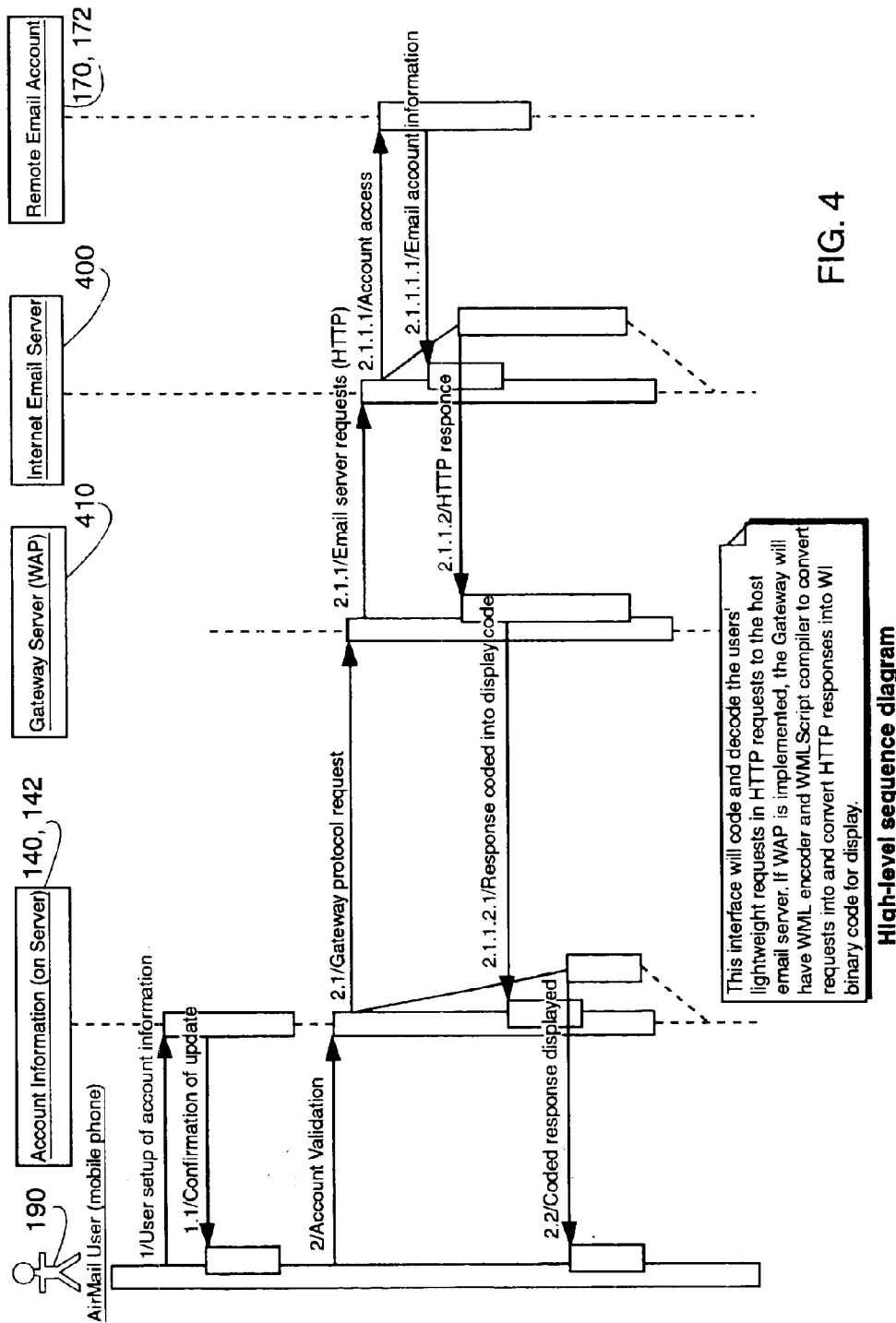
FIG. 4 shows a high-level sequence diagram of an exemplary design interfaces for a UMail/MoMail application, in accordance with the principles of the present invention.

For instance, FIG. 4 shows a high-level sequence diagram of an exemplary design interface for a universal mail application implemented in a wireless application protocol (WAP) gateway, in accordance with the principles of the present invention.

In particular, as shown in FIG. 4, Wireless Application Protocol (WAP) may be implemented. If so, then Wireless Markup Language (WML) and references to WMLScripts are preferably utilized to perform the operations of the universal mail application.

As another example, common gateway interface (CGI) scripts may be implemented to receive the relevant information, which may then create WML decks for displaying the results. Most other interfaces such as HDML, HTML or PQA may require a servlet type or Java Server Page (JSP) based interface for remote access and processing.

As shown in message 1 of FIG. 4, and in FIG. 1, a subscriber 190 initially sets up the initial email account information in the relevant email account information files 140, 142 e.g., using suitable display prompting, using customer service representative over the telephone, using a PC application interface, etc.

Message 1.1 shows confirmation of the input/updated email account information in any or all of the relevant email account information file(s) 140, 142.

Message 2 shows email account validation passing from the subscriber's mobile device 190 to the relevant email account information file 140 or 142. The compilation module 120 passes, in message 2.1, a gateway protocol request message to the Wireless Internet Gateway 410.

Message 2.1.1 passes email server requests in HTTP format to the relevant email server 400 (not shown in FIG. 1 for simplicity of description), which in turn accesses the relevant email application 170, 172 as shown in message 2.1.1.1.

In return message 2.1.1.1.1, email account information is passed from the relevant remote email application program 170, 172 back to the internet email server 400, which responds using HTTP protocol to the Wireless Internet Gateway/MoMail server 410 (Message 2.1.1.2).

In message 2.1.1.2.1, the Wireless Internet Gateway/MoMail 410 appropriately formats the response email information into display code, and passes the same on to the email compilation module 120 in the universal mail application 100. The email is forwarded to the subscriber where it is appropriately displayed on the display 195, as depicted in Message 2.2 of FIG. 4.

Figure 5:
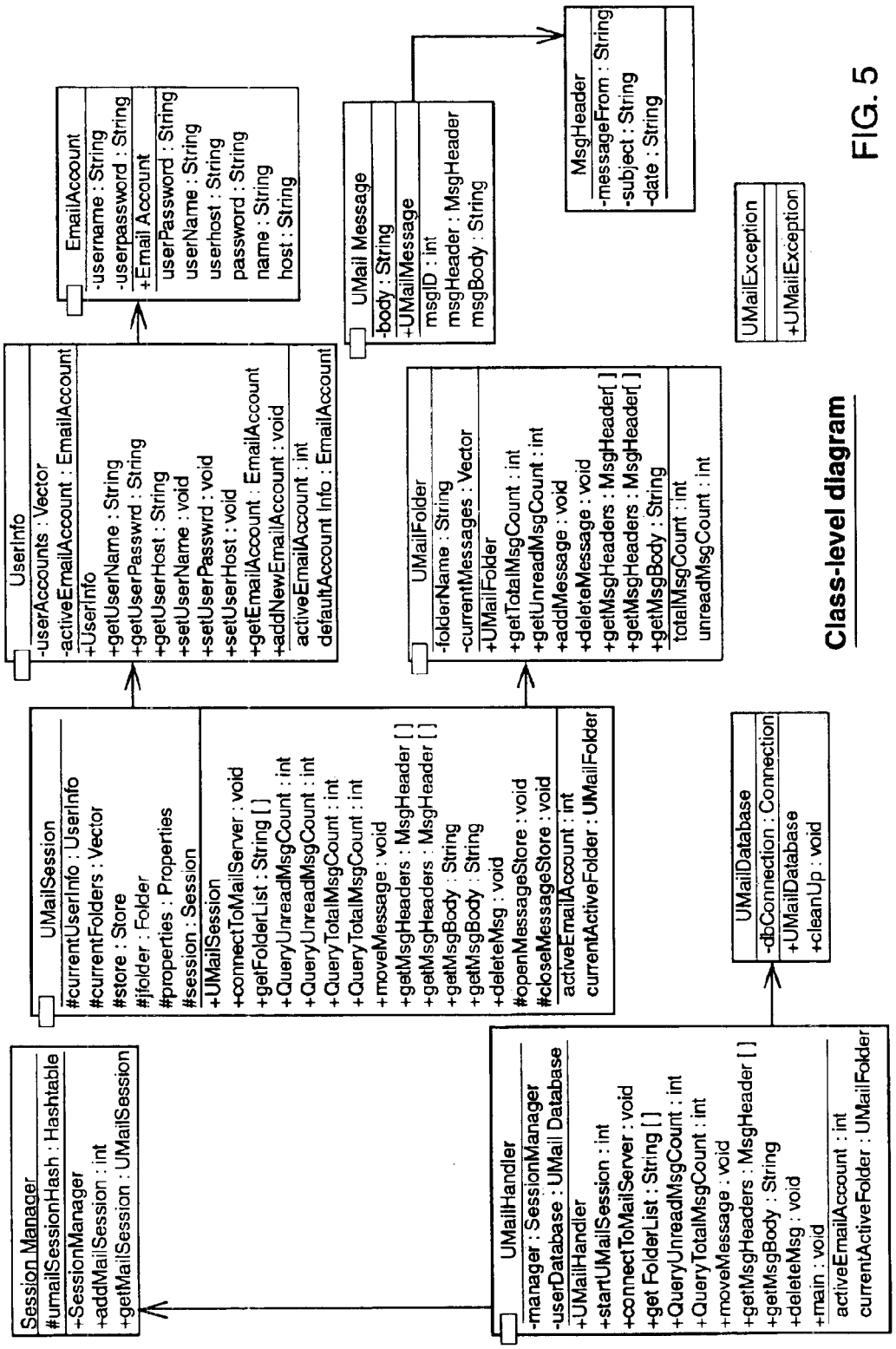
FIG. 5 shows an exemplary class hierarchy of an embodiment of a universal mail application in accordance with the principles of the present invention.

FIG. 5 shows an exemplary class hierarchy of an embodiment of a universal mail application 100 in accordance with the principles of the present invention.

In particular, specific classes shown in FIGS. 1 and 5 are described herein below with respect to their function and the role they play.

UMailHandler: This is the primary interface class for the UMail application 100. This class, or some derivation of this class, preferably provides high-level functionality to the user interface of the wireless device 190.

As disclosed, this class has a SessionManager object to control and maintain multiple UMail sessions as well as a UMailDatabase object to perform user login verification.

IRemoteHandler: This class extends java.rmi.Remote and offers a remote interface to active servlets. This objects provides the same functionality as the UMailHandler class, but allows calls to be made remotely.

UMailRemoteHandler: This class is derived from the UMailHandler class and implements the remote interface class. This is the RMI implementation class for RMI interfaces.

SessionManager: This class maintains a java Hashtable of all of the active Umail sessions. This class provides the ability to add a new Umail session, remove a Umail session, and/or access or increment a session ID counter.

UMailDatabase: This class handles all of the database interfaces for the UMail application. It provides the ability to create a connection to the database, access information, and provides all of the relevant users' configuration information to the Umail application 100.

UMailSession: This is the object which is created by the SessionManager. Each UMailSession object is associated with a specific session identification number (SID). Each object contains a UserInfo object for all configuration information, a list of current folders available and all of the current folder properties (which by default may be, e.g., the account 'Inbox').

This class provides the ability to switch accounts, to retrieve a list of message headers, to determine number of messages information, or to retrieve a specific message for viewing.

UserInfo: This object contains an array of EmailAccount objects and all of the information associated with the currently active email accounts.

EmailAccount: Each instance of this class maintains account provisioning information for a single configured account. Basically, this includes, e.g., a username, a password, and an IMAP host name for the account.

This information is used when switching from one email account to another, and is initialized with database information upon creation.

UMailFolder: This class contains the name assigned to the account, and an array of UMailMessage objects representing each of the messages in the account 'Inbox'. The class provides the means to access a specific message object, retrieve a number of new messages, determine a total number of messages, and/or to delete a specific message from the folder.

UMailMessage: This class is a representation of an actual email message. The object contains a UMailMsgHeader object, a message ID, and the body of the message it represents.

UMailMsgHeader: This class contains only the header information for a message. This includes, e.g., the 'from' string, the 'subject' string, and the 'date' string.

UMailException: This class is an extension of the java exception class. It defines and handles specific UMail exceptions.

UMailRemote_Client: This is the client object for a simple RMI implementation. It provides a simple command menu interface to the UMail application 100.

UMailRemote_Server: This is the server object for a simple RMI implementation. This is a very simple main which simply creates a UMailRemoteHandler object for the client to interface with remotely. The creation of the UMailRemoteHandler object automatically performs name binding into the rmiregistry to allow a remote client the ability to find the remote object.

UMailTestDriver: This is a simple local stand-alone application main for the UMail application 100. This is the main driver program which was used during testing and development of the core application.

While the invention has been described with reference to the exemplary embodiments thereof, those skilled in the art will be able to make various modifications to the described embodiments of the invention without departing from the true spirit and scope of the invention.

What is claimed is:

1. A universal mail module, comprising:
    a plurality of email account information files relating to a corresponding plurality of email accounts of a wireless subscriber;
    an email agent in communication with said plurality of email account information files, said email agent maintaining a logged-in condition with at least two of said plurality of email accounts; and
    a selection module which accepts a selection of one of said plurality of logged-in email accounts for transfer of file information;
    whereby said wireless subscriber may move back and forth between access to each of said plurality of email accounts without requiring repeated login/logout of any of said plurality of email accounts by said wireless subscriber.

2. The universal mail module according to claim 1, wherein:
    said selection module further accepts a selection of a particular file of said selected one of said plurality of logged-in email accounts for transfer to said wireless subscriber.

3. The universal mail module according to claim 1, wherein:
    said selection module receives a menu selection from said wireless subscriber.

4. The universal mail module according to claim 1, wherein:
    said plurality of email accounts are outside a wireless network servicing said wireless subscriber.

5. A method for allowing a wireless subscriber to move access back and forth between a plurality of different email accounts, comprising:
    configuring local email account information identifying each of said plurality of different email accounts to a universal mail application;
    maintaining a logged-in condition with each of said plurality of different email accounts by said universal mail application; and
    providing access to said wireless subscriber to any one of said plurality of different email accounts at any time based on a real-time selection made by said wireless subscriber;
    whereby a wireless subscriber is allowed to move back and forth between each of said plurality of email accounts without requiring repeated login/logout in any of said plurality of email accounts.

6. The method for allowing a wireless subscriber to move access back and forth between a plurality of different email accounts according to claim 5, wherein:
    said configuring may be performed by said wireless subscriber without customer service intervention.

7. The method for allowing a wireless subscriber to move access back and forth between a plurality of different email accounts according to claim 5, wherein:
    said universal mail application is resident in a gateway server of a wireless network servicing said wireless subscriber.

8. The method for allowing a wireless subscriber to move access back and forth between a plurality of different email accounts according to claim 5, further comprising:
    forwarding menu information to said wireless subscriber relating to which of said plurality of different email accounts said wireless subscriber would like access to; and
    receiving back from said wireless subscriber a selection of which one of said plurality of different email accounts will be accessed by said wireless subscriber;
    wherein a logged-in condition is maintained by said universal mail application with non-selected ones of said plurality of different email accounts.

9. The method for allowing a wireless subscriber to move access back and forth between a plurality of different email accounts according to claim 5, wherein:
    said plurality of email accounts are outside a wireless network servicing said wireless subscriber.

10. Apparatus for allowing a wireless subscriber to move access back and forth between a plurality of different email accounts, comprising:
    means for configuring local email account information identifying each of said plurality of different email accounts to a universal mail application;
    means for maintaining a logged-in condition with each of said plurality of different email accounts by said universal mail application; and
    means for providing access to said wireless subscriber to any one of said plurality of different email accounts at any time based on a real-time selection made by said wireless subscriber;
    whereby a wireless subscriber is allowed to move back and forth between each of said plurality of email accounts without requiring repeated login/logout in any of said plurality of email accounts.

11. The apparatus for allowing a wireless subscriber to move access back and forth between a plurality of different email accounts according to claim 10, wherein:
    said means for configuring is instructed by said wireless subscriber without customer service intervention.

12. The apparatus for allowing a wireless subscriber to move access back and forth between a plurality of different email accounts according to claim 10, wherein:
    said universal mail application is resident in a gateway server of a wireless network servicing said wireless subscriber.

13. The apparatus for allowing a wireless subscriber to move access back and forth between a plurality of different email accounts according to claim 10, further comprising:
    means for forwarding menu information to said wireless subscriber relating to which of said plurality of different email accounts said wireless subscriber would like access to; and
    means for receiving back from said wireless subscriber a selection of which one of said plurality of different email accounts will be accessed by said wireless subscriber;
    wherein a logged-in condition is maintained by said universal mail application with non-selected ones of said plurality of different email accounts.

14. The apparatus for allowing a wireless subscriber to move access back and forth between a plurality of different email accounts according to claim 10, wherein:
    said plurality of email accounts are outside a wireless network servicing said wireless subscriber.

* * * * *